US010812338B2

(12) United States Patent
Stallmann

(10) Patent No.: US 10,812,338 B2
(45) Date of Patent: Oct. 20, 2020

(54) METHOD AND SYSTEM FOR CUSTOMIZATION OF COMPUTER SYSTEMS

(71) Applicant: SAP SE, Walldorf (DE)

(72) Inventor: Florian Stallmann, Walldorf (DE)

(73) Assignee: SAP SE, Walldorf (DE)

(*) Notice: Subject to any disclaimer, the term of this patent is extended or adjusted under 35 U.S.C. 154(b) by 244 days.

(21) Appl. No.: 15/415,907

(22) Filed: Jan. 26, 2017

(65) Prior Publication Data

US 2018/0210707 A1 Jul. 26, 2018

(51) Int. Cl.
*H04L 12/24* (2006.01)
*G06F 16/22* (2019.01)
*G06F 16/901* (2019.01)
*G06F 8/61* (2018.01)

(52) U.S. Cl.
CPC ............ *H04L 41/0893* (2013.01); *G06F 8/61* (2013.01); *G06F 16/2246* (2019.01); *G06F 16/9027* (2019.01); *H04L 41/0803* (2013.01)

(58) Field of Classification Search
CPC ........ G06F 17/30327; G06F 8/20; G06F 8/70; G06F 16/2246; G06F 16/9027; G06F 9/4451; G06F 8/60–8/66; H04L 41/08–0896
USPC ................................................. 717/168–173
See application file for complete search history.

(56) References Cited

U.S. PATENT DOCUMENTS

| | | | |
|---|---|---|---|
| 6,697,851 B1 * | 2/2004 | Althaus | ............ H04L 29/12216 370/254 |
| 7,760,746 B2 * | 7/2010 | Betts | .................. G06F 9/44505 370/408 |
| 2001/0051904 A1 | 12/2001 | Nishimura | |

FOREIGN PATENT DOCUMENTS

| | | |
|---|---|---|
| GB | 2343972 A | 5/2000 |
| WO | WO-94/23372 A1 | 10/1994 |

OTHER PUBLICATIONS

Office Action for corresponding European Application No. 17153293.0 dated Jun. 4, 2018.
Search Report for corresponding European Application No. 17153293.0 dated May 18, 2017.

* cited by examiner

*Primary Examiner* — Todd Aguilera
(74) *Attorney, Agent, or Firm* — Harness, Dickey & Pierce, P.L.C.

(57) ABSTRACT

A computer system comprising a database, a computer-implemented method, and a non-transitory computer-readable medium having stored thereon a computer executable program code for customization of computer systems are disclosed herein. The customizations dimensions have context values being used as coordinates in a multidimensional customization space. The computer systems are customized using global customization specifications and differential customization specifications. In each customization procedure, either global customization specifications or differential customization specification assigned to one of the nodes of the selected tree fragment is used. The sequence of customization procedures can follow parent-child relationships of nodes of the selected tree fragment.

20 Claims, 8 Drawing Sheets

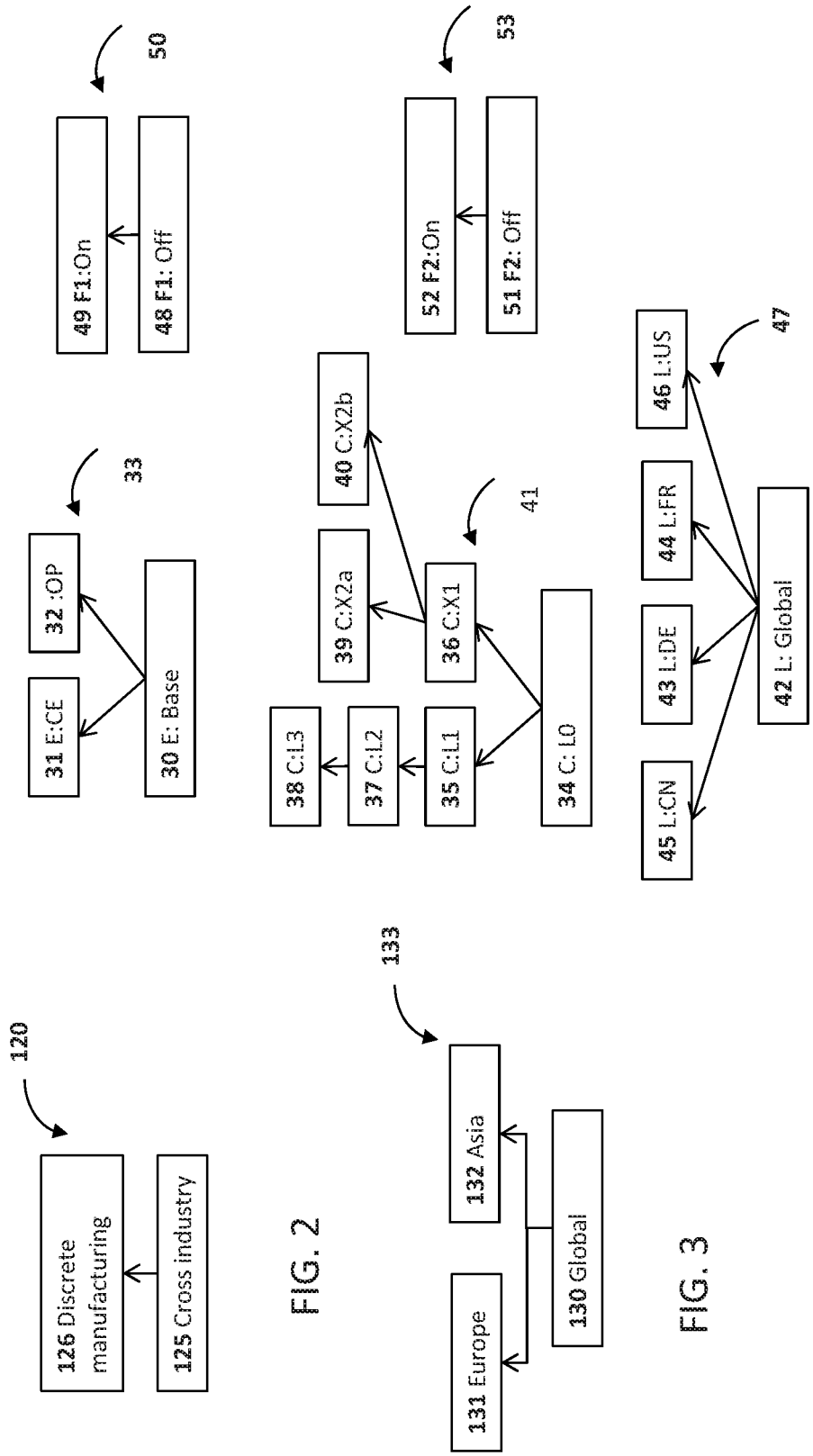

| | Customization specification | Industry | Localization |
|---|---|---|---|
| 151 → | Global, Cross-industry | 0 | 0 |
| 152 → | Europe | 0 | 1 |
| 153 → | Asia | 0 | 2 |
| 154 → | Discrete manufacturing | 1 | 0 |
| 155 → | Discrete manufacturing in Europe | 1 | 1 |
| 156 → | Discrete manufacturing in Asia | 1 | 2 |

METHOD AND SYSTEM FOR CUSTOMIZATION OF COMPUTER SYSTEMS

TECHNICAL FIELD

This invention relates to customization of computer systems. In particular, this invention relates to a generation of various customization variants of a computer system using differential customization specifications.

BACKGROUND

Almost every computer system has customization options. For instance, users of personal computers can select customization options such as a language of user interface, system of units (e.g. centimeter-gram-second system of units (CGS) or International System of Units (SI)), etc. Customization of computer systems can comprise complex operations like changing of hardware and/or software configuration. As usual these procedures are executed by suppliers/providers of software/hardware systems. The suppliers/providers can distribute customization specifications for customizing as regular updates for computer systems installed on user sites. Alternatively or in addition the customization of computer systems can be driven by the need to address user specific demand in different industries and/or countries. In this case the suppliers/providers provide customization specifications in response to user demands/requests. The user demands/requests can be determined by their experience of using computer systems and/or performance of the computer systems.

SUMMARY

The disclosure generally describes computer-implemented methods, computer-readable media storing computer-executable code for execution of computer-implemented methods, computer systems, and computer clusters for customization of computer systems. These technologies are applicable for a broad spectrum of applications ranging from a single computer system to a computer cloud environment. The computer systems have various hardware and/or software functionalities which can be customized in different customization dimensions. The customizations dimensions have context values being used as coordinates in a multidimensional customization space. The customization of computer system is executed using global customization specifications and differential customization specifications specified for each customization dimension. In addition, differential customization specifications are specified for some combinations of context values of different customization dimensions. Utilization of global customization specifications and differential customization specifications is defined by rules determined by ranking of the customization dimensions and/or context values of the customization dimensions. Assigning of differential customization specifications to nodes of a tree structure, wherein each node has a tuple of context values being coordinates of that node in a multidimensional customization space, and selecting a fragment of the tree structure using context values specified in the customization request enables generation of an effective customization procedure using global customization specifications and differential customization specifications assigned to nodes of the selected fragment of the tree. In each customization procedure, either global customization specifications or differential customization specification assigned to one of the nodes of the selected tree fragment is used. The sequence of customization procedures can follow parent-child relationships of nodes of the selected tree fragment.

One of the advantages of the customization process described herein is a possibility to customize the computer system for any combination of the context values using differential customization specifications specified only for a limited number of combinations of the context values. In other words there is no need to generate (and maintain) differential customization specifications for each possible combination of the context values.

It is an objective of embodiments of the invention to provide for a computer system configured to provide effective customization of computer systems, a computer-implemented method for executing the same, and a computer readable medium having stored thereon a computer executable program code for executing the computer-implemented method. Advantageous embodiments are described in the dependent claims.

According to one embodiment, the present invention relates to a computer-implemented method for customization of a computer system. The customization has multiple customization dimensions. Each dimension has an assigned data structure stored in a database system. Each of the data structures is a rooted tree of a set of first trees. Each child node has only one parent node. Each root node has assigned a global customization specification for the customization dimension to which the each root node is assigned. Each tuple of nodes of the rooted trees has assigned a differential customization specification. Each tuple comprises at least one child node of any of the rooted trees. The tuples define at least a second tree. Each node of the first trees has a context value assigned to one of the customization dimensions. The method comprises: receiving by the database system a request specifying a context value for at least some of the customization dimensions; performing by the database system a tree traversal of the second tree according to the request for those of the customization dimensions for which the context value is specified in the request; generating by the database system a customization specification for the system using the global customization specifications by modifying the global customization specification for those customization dimensions for which the tree traversal has been performed in accordance with the differential customization specifications given by the performed tree traversals; and customizing the computer system according to the generated customization specification.

According to another embodiment, the present invention relates to a computer readable medium having stored thereon a computer executable code for execution by computer processors controlling a computer system, wherein execution of the instructions of the executable code causes the computer processors to execute the computer-implemented method of the aforementioned embodiment.

According to one embodiment, the present invention relates to a database system for a customization of a computer system. The customization has multiple customization dimensions. Each dimension has an assigned data structure stored in a database system. Each of the data structures is a rooted tree of a set of first trees. Each child node has only one parent node. Each root node has assigned a global customization specification for the customization dimension to which the each root node is assigned. Each tuple of nodes of the rooted trees has assigned a differential customization specification. Each tuple comprises at least one child node of any of the rooted trees. The tuples define at least a second tree. Each node of the first trees has a context value assigned to one of the customization dimensions. The database system being configured to: receiving by the database system a request specifying a context value for at least some of the customization dimensions; performing by the database system a tree traversal of the second tree according to the request for those of the customization dimensions for which the context value is specified in the request; generating by the database system a customization specification for the system using the global customization specifications by modifying the global customization specification for those customization dimensions for which the tree traversal has been performed in accordance with the differential customization specifications given by the performed tree traversals; and customizing the computer system according to the generated customization specification.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is an example data structure.
FIG. 3 is an example data structure.
FIG. 4 is an example data structure.

DETAILED DESCRIPTION

Figure 1:
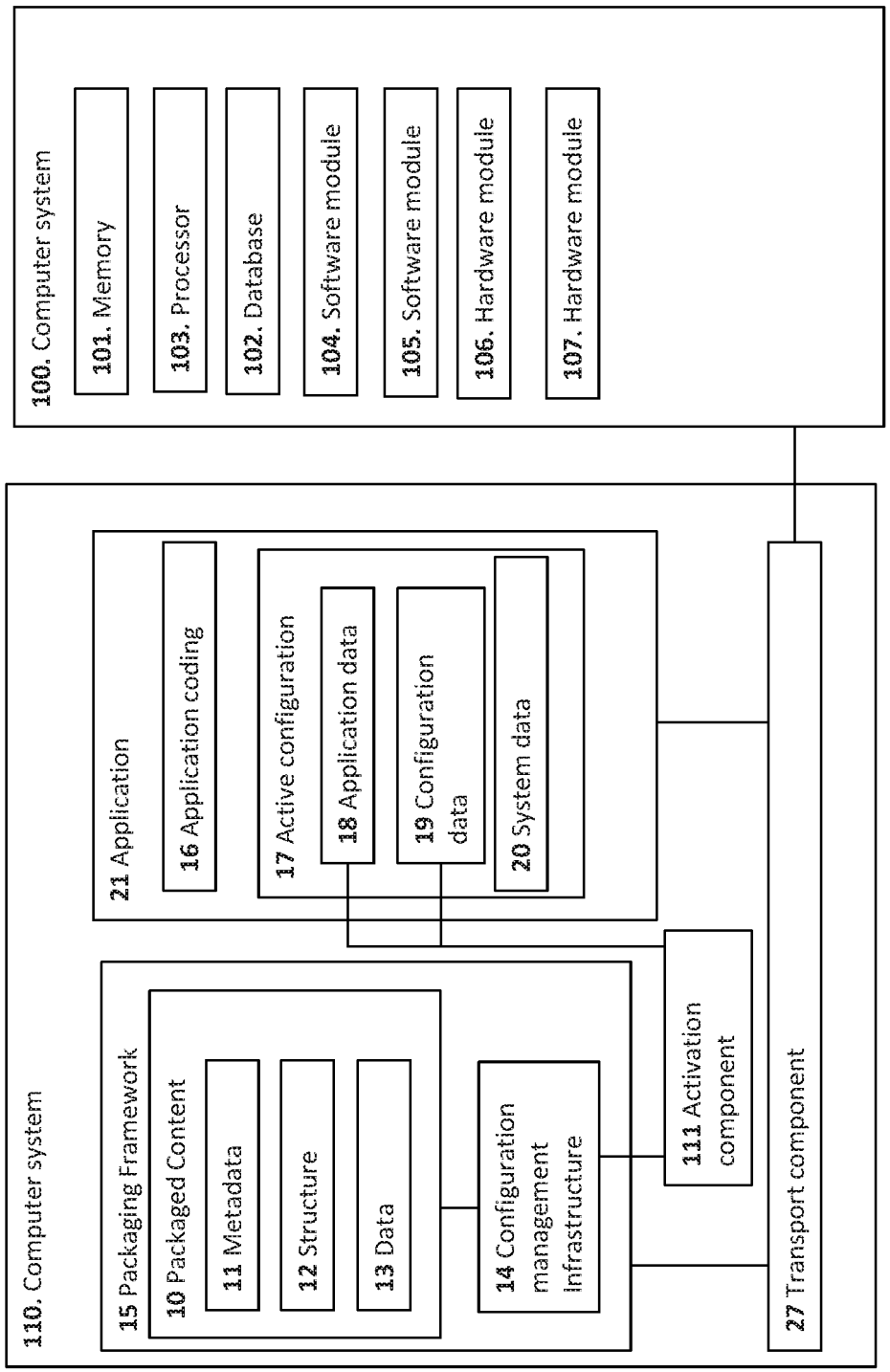
FIG. 1 is a block diagram illustrating an example environment for storing and processing of data items in a database.

The following description is presented to enable any person skilled in the art to practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

As it is mentioned above customization of a computer system can require generation and maintenance of a big number of customized versions of the computer system. The origin of such a big number is a big number of all possible combinations of context values. For instance, a multidimensional customization space can be a 3-dimensional space. One dimension can be a type of industry (e.g. chemical, automotive, textile, oil, etc.). Another dimension can be a dimension determining geographic location (e.g. Germany, France, Italy, Spain, etc.). Another dimension could be related to various configurations software/hardware modules of the computer systems. When each of the dimensions has 10 different customization versions of the computer system, then the overall number of customization versions is 1000. In other words increase in customizations dimensions results in exponential growth of the overall number of the customization versions.

Effective management of customization variants is achieved herein by employing the following approach. The customization specifications used for customization procedures are formulated as a global customization specification and differential customization specifications for each of the customization dimensions. The customization of the computer system in one of the customization dimensions can comprise a customization procedure for customization of the computer system using the global customization specification for that customization dimension and one or more customization procedures each using the differential customization specification for that customization dimension. The utilization of the differential customization specifications in customization procedures can be determined by rules specifying a sequence in which differential customization procedures are to be used in customization operations. The rules can specify that execution of a customization procedure using either one of differential customization specifications or another one of differential customization specifications can require execution of the same sequence of the customization procedures using the global customization specification and as option one or more of the other differential customization specifications. This way of structuring of the differential customization specifications can provide for reduction of data volume required for storing the differential customization specifications.

This way of formulation of the differential customization specifications can be illustrated by way of the following example. One of the customization dimensions can have the following customization specifications: global customization specification, a differential customization specification for Asia, a differential customization specification for Europe, a differential customization specification for Japan, a differential customization specification for Korea, a differential customization specification for Germany, and a differential customization specification for Italy. The rule can specify that the customization procedure using the differential customization specification for Asia or Europe can be executed only after execution of the customization procedure using the global customization specification. While the customization procedure using the differential customization specification for Germany or Italy can be executed only after execution of the customization procedure using the differential customization specification for Europe and the customization procedure using differential customization specification for Japan or Korea can be executed only after execution of the customization procedure using the differential customization specification for Asia.

In addition differential customization specifications can be specified for two of more customization dimensions. Further rules can specify sequence of execution of customization procedures using customization specifications specified for several customization dimensions and procedures using customization specifications using customization specifications specified for only one of the customization dimensions. The customization of the computer system for several customization dimensions can be executed by selecting global customization specifications and differential customization specifications according to another rule determining a choice of said customization specifications in accordance with a specification for customization formulated in a request for customization of the computer system.

This approach can provide for a minimization of a number of the differential customization specifications required for the customization of the computer system in any combination of the customization dimensions.

According to another embodiment, the second tree is a rooted tree having a root node representing a tuple of the root nodes assigned to the customization dimensions for which the context value is specified in the request. Each of the tuples comprising at least one child node is represented by a child node of the second tree. Parent-child relationships between the nodes in the second tree are determined by the following rule: one node is a child node of another node when the tuple represented by the one node and the tuple represented by the another node comprise the same nodes of the rooted trees of the set of the first trees except for one of the nodes of one of the rooted trees of the set of the first trees comprised in the tuple represented by the one node and the parent node of the one of the nodes of the one of the rooted trees of the set of the first trees comprised in the tuple represented by the another node. A mathematically equivalent way to express this rule is as follows: one node is a child node of another node when the tuple represented by the one node and the tuple represented by the another node comprise the same nodes of the rooted trees of the set of the first trees except for one of the nodes comprised in the tuple represented by the one node and one of the nodes comprised in the tuple represented by the another node, wherein the one of the nodes comprised in the tuple represented by the one node is the child node in one of the rooted trees of the set of the first trees having the parent node being the one of the nodes comprised in the tuple represented by the another node.

This rule can be illustrated by the following example. A parent node in the second tree representing a tuple of nodes A0, B0, C0 can have only the following child nodes: a child node representing a tuple of nodes A1, B0, C0, a child node representing a tuple of nodes A0, B1, C0; a child node representing a tuple of nodes A0, B0, C1. The node A1 is a child node of the node A0 in one of the first rooted trees. The node B1 is a child node of the node B0 in another one of the first rooted trees. The node C1 is a child node of the node C0 in yet another one of the first rooted trees.

According to another embodiment, the global customization specifications and the differential customization specifications are stored in a tabular form. Each of the tuples except for the tuple represented by the root node of the second tree has in the tabular form an assigned row comprising all of the context values of the nodes of that tuple and one of the differential customization specifications assigned to that tuple. The tuple represented by the root node of the second tree has in the tabular form an assigned row comprising all of the context values of the nodes of the tuple represented by the root node of the second tree and all of the global customization specifications assigned to the nodes of that tuple. The database system stores a rule for selection of one of the rows on a basis of context values specified in requests. The performing by the database system of the tree traversal of the second tree according to the request for those of the customization dimensions for which the context value is specified in the request comprises the following: identifying the row according to the rule on a basis of the context values specified in the request; identifying the tuple to which the identified row is assigned; and identifying in the second tree nodes linked by parent-child relationships starting from the root node up to and including the child node representing the identified tuple. The generating by the database system of the customization specification comprises generating a sequence of customization procedures using the differential customization specifications comprised in the rows assigned to the tuples represented by the identified child nodes and the global customization specifications comprised in the row assigned to the tuple of the root nodes. The customizing of the computer system according to the generated customization specification comprises execution of the generated sequence of customization procedures.

According to another embodiment, in the customization procedure being the first in the sequence the computer system is customized using the global customization specifications comprised in the row assigned to the tuple of the root nodes. In each next customization procedure of the sequence the computer system is customized using the differential customization specification comprised in the row assigned to the tuple represented by the identified child node having the identified parent node representing the tuple assigned to the row comprising either the global customization specifications used for customization of the computer system in the customization procedure being in the sequence immediately before the each next customization procedure or the differential customization specification used for customization of the computer system in the customization procedure being in the sequence immediately before the each next customization procedure. In the customization procedure being the least in the sequence the computer system is customized using the differential customization specification comprised in the identified row.

According to another embodiment, the rule comprises a ranking value of each of the customization dimensions. The identifying of the row according to the rule on the basis of the context values specified in the request comprises the following steps being executed iteratively: identifying the customization dimension having the highest ranking value; selecting all rows comprising the context value of the identified customization dimension; calculating, for each of the selected rows, a delta value being equal to an absolute value of a difference of the context value of the identified customization dimension specified in the request and the context value of the identified customization dimension comprised in the each of the selected rows; identifying a minimum delta value among all of the calculated delta values; and selecting all of the rows having the minimum delta value. In the first iteration in the step of identifying of the customization dimension the customization dimension having the highest ranking is identified among those customization dimensions for which the context value is specified in the request. In any next iteration in the step of identifying of the customization dimension the customization dimension having the highest ranking is identified among those customization dimensions for which the context value is specified in the request except for each of the customization dimensions which was identified in any of the previous iterations. In the first iteration in the step of selecting of the all of the rows comprising the context value of the identified customization dimension the all rows are selected from all rows of the tabular form. In each next iteration in the step of selecting of the all rows comprising the context value of the identified customization dimension the all rows are selected from the all rows selected in the step of selecting of the all rows comprising the context value of the identified customization dimension executed in the iteration being executed immediately before the each next iteration. Execution of iterations is continued until in the last execution of the step of selecting of the all of the rows having the minimum delta value only one row is selected. The only one row is the identified row.

According to another embodiment, the method comprises: sending the customization procedures from the database system to the computer system one by one according to the sequence, wherein each next customization procedure is sent only after execution of the previously sent customization procedure in the execution of the generated sequence of the customization procedures.

According to another embodiment, a transport component is communicatively coupled to the computer system and the database system. The method comprises: sending the generated customization specification from the database system to the computer system via the transport component.

According to another embodiment, an activation component is configured for controlling of execution of customizations of computer system according to customization specifications. Execution of the customizing of the computer system according to the generated customization specification is controlled by the activation component.

According to another embodiment, the activation component is comprised in the database system.

According to another embodiment, the computer system is operable for execution of an executable code. The executable code comprises software modules being configurable using configuration data. Each of the global customization specification comprises a list of the software modules and configuration data. Each of the differential customization specifications comprises a first list of the software modules to be added to the software code, a second list of the software modules to be deactivated in the software code, and configuration data. The generated customization specification comprises one of the global customization specifications and one of the differential customization specifications. The global customization specifications and the differential customization specifications are stored in a data storage of the database system. The software modules are stored in another data storage of the database system. The method comprises: retrieving from the data device the one of the global customization specifications and the one of the differential customization specifications; retrieving from the another data storage software modules specified in a list of the one of the global customization specifications and software modules specified in a first list of the one of the differential customization specifications; sending from the database system to the computer system first data, the first data comprising the retrieved software modules specified in the list of the one of the global customization specifications and configuration data comprised in the one of the global customization specifications; and sending from the database system to the computer system a second data, the second data comprising the retrieved software modules specified in the first list of the one of the differential customization specifications, a second list comprised in the one of the differential customization specifications, and configuration data comprised in the one of the differential customization specifications.

According to another embodiment, an activation component is configured for controlling of execution of sending from the database system to the computer system of data and execution of customizing of computer systems according to customization specifications. The execution of the customizing the computer system according to the generated customization specification comprises: receiving by the computer system the first data; in response to the receiving by the computer system of the first data the activation component installing the software code on the computer system code, wherein the installing of the software code on the computer system comprises installing the software modules comprised in the first data using the configuration data comprised in the first data. The activation component causes the sending from the database system to the computer system of the second data in response to completion of the installing of the software code on the computer system by the activation component. The execution of the customizing the computer system according to the generated customization specification further comprises: receiving by the database system the second data; and in response to the receiving by the computer system of the second data the activation component executing the following: deactivating software modules of the executable code on the computer system which are specified in the second list comprised in the second data; adding to the executable code on the computer system the software modules comprised in the second data; and after the deactivating software modules of the executable code on the computer system and the adding to the executable code on the computer system of the software modules comprised in the second data configuring the executable code on the computer system using the configuration data comprised in the second data.

FIG. 1 illustrates an example environment for customization of a computer system 100 using a computer system 110, which can be a database system. The computer system 100 comprises a memory 101, one or more computer processors 103, a database 102, software modules 105 and 104, and hardware modules 106 and 107. The computer system 100 can be communicatively coupled via one or more computer networks or a transport component 110 to the database system 110. The database system 110 comprises one or more data storages 15 and 21 and an activation component 111. The data storage 15 can be a packaging framework comprising a packages content component 10 and a configuration management infrastructure 14. The data storage 21 can be an application component comprising an application coding component 16 and an active configuration component 17. The packaging component 10 can comprise metadata 11, a structure data 12, and data 13. The active configuration component 17 comprises application data 18, configuration data 19, and system data 20. The activation component 111 is communicatively coupled to the configuration management infrastructure 14, application data 18, and configuration data 19. The transport component 27 is communicatively coupled to the data storage 15, the another data storage 21, and the computer system 100. The transport component is configured to manage software logistics and to distribute coding and data in a system landscape. The components 101-107 of the computer system 100 can be customized using global and differential customization specifications stored in the data storage 15 and/or data storage 21.

The data storage 15 can store the global and the differential customization specifications. The customization specifications can be stored in a form of packaged content stored in the packaged content component 10. The data 13 can be global and the differential customization specifications. The structure data 12 can be the data enabling selection specific business scope and/or promotion reusing in the authoring process. The metadata 11 can be an additional content data. The configuration management infrastructure is configured to process the packaged content and to deliver the required content to data storage 21. The data storage 21 can store software modules which can be installed on the computer system 100. The software modules can be stored in the application coding component 16. The active configuration component 17 can store information being descriptive of a current configuration of the computer system to be customized, such as application data 18, configuration data 19, and system data 20.

The computer system 100 can be operable for execution of software code comprising software modules 105, 106, and software modules stored in the data storage 21. The software modules can be configured using configuration data. The activation component can be configured to operate customization of the computer system. The customization of the computer system can comprise customization of components 101-107 comprised in the computer system and installing other software modules stored on the data storage 121. Each of the customization dimensions for customization of the computer system 100 can have an assigned data structure stored in the data storage 15. Each of the data structures is a rooted tree. Each rooted tree has only one parent node. Each node of the rooted tree has an assigned context value being assigned to the same customization dimension as that rooted tree. Each of the context values is assigned to only one node. Each root node can have an assigned global customization specification for customization of the computer system in the customization dimension to which that root node is assigned. Each child node can have an assigned differential customization specification for customization of the computer system in the customization dimension to which that child node is assigned. The rooted trees are first rooted trees constituting a set of the first rooted trees. Each (of some) of the global customization specifications comprises a first list of the software modules and configuration data. Each (of some) of the differential customization specifications comprises a first list of the software modules to be added to the software code, a second list of the software modules to be deactivated in the software code, and configuration data.

In case when the customization of the computer system is required in only one of the dimensions and a context value is specified for that dimension then the customization of the computer system can be executed as follows. The database system identifies the rooted tree assigned to the customization dimension for which the customization is to be performed. When the specified context value is a context value assigned to a root node of the identified tree, the database system executes customization of the computer system using a global customization specification assigned to that root node; otherwise the following sequence of steps is executed. The database system identifies a node in the identified rooted tree to which the context value specified in the request is assigned. The identified node is used for identification of all child nodes in the identified rooted tree starting from the root node and up to and including the identified node. The customization procedure executed by the database system comprises a sequence of customization procedures. A number of the customization procedures in the sequence is equal to a number of the identified nodes. In the customization procedure being the first in the sequence the computer system is customized using the global customization specification assigned to the identified root node. In each next customization procedure of the sequence the computer system is customized using the differential customization specification assigned to the identified child node having the identified parent node having assigned either the global customization specification used for customization of the computer system in the customization procedure being in the sequence immediately before the each next customization procedure or the differential customization specification used for customization of the computer system in the customization procedure being in the sequence immediately before the each next customization procedure.

FIGS. 2 and 3 depict examples of such rooted trees. The rooted tree depicted in FIG. 2 is assigned to a customization dimension "Industry". The rooted tree depicted in FIG. 2 has a root node 125 having an assigned context value "Cross-industry". The root node 125 can have an assigned global customization specification "Cross-industry". The parent node 125 has a child node 126 to which a context value "Discrete manufacturing" is assigned. The child node 126 can have a differential customization specification "Discrete manufacturing" assigned. The rooted tree depicted in FIG. 3 is assigned to a customization dimension "Localization". The rooted tree depicted in FIG. 3 has a root node 130 having an assigned context value "Global". The root node can have an assigned global customization specification "Cross-industry". The parent node 130 has child nodes 131 and 132. A context value "Europe" is assigned to the child node 131. A differential customization specification "Europe" can be assigned to the child node 131. The context value "Asia" is assigned to the child node 132. A differential customization specification "Asia" can be assigned to the child node 132. The rooted trees depicted in FIGS. 2 and 3 can have further child nodes. Further differential customization specifications and context values can be assigned thereto. The child node 131 can have child nodes having context values and differential customization specifications for different European countries. The child node 132 can have child nodes having context values and differential customization specifications for different Asian countries. The child node 126 or the root node 125 can have further child nodes each having assigned a context value and a differential customization specification for a type of industry (e.g. chemical, banking, automotive, etc.). The rooted trees depicted in FIGS. 2 and 3 are limited to a few nodes merely for illustrative purposes. As it will be seen from FIG. 5 the resulting rooted tree, wherein each node represents a customization variant has already 6 nodes.

FIG. 4 depicts another example plurality of rooted trees 33, 50 41, 53, and 47. The rooted tree 30 has a root node 30 having an assigned context value "Base". A global customization specification "Base" is assigned to the root node 30. The root node 30 has a child node 31 having an assigned context value "CE" corresponding to a customization variant of the computer system configured to operate in a computer cloud. A differential customization specification can be assigned to the child node 31 for customization of the computer system enabling its operation in the computer cloud. The root node 30 has another child node 32 having an assigned context value "OP" corresponding to a customization variant of the computer system configured to operate on a customer site. This customization variant is called "on premise". A differential customization specification can be assigned to the child node 32 for customization of the computer system enabling its operation in the customer site.

The rooted tree 41 has a root node 34 having an assigned context value "L0". A global customization specification "L0" is assigned to the root node 34. The global customization "L0" is used for a default customization of a functionality L of the computer system. The root node 34 has a child node 35 having an assigned context value "L1". A differential customization specification can be assigned to the child node 35. The differential customization specification can be used for customization of the feature L for context value "L1". The root node 34 has another child node 36 having an assigned context value "X1". A differential customization specification can be assigned to the child node 36. The differential customization specification can be used for customization of the feature L for context value "X1".

The child node 35 has a child node 37 having an assigned context value "L2". A differential customization specification can be assigned to the child node 37. The differential customization specification can be used for customization of the feature L for context value "L1". The child node 37 has a child node 38 having an assigned context value "L3". A differential customization specification can be assigned to the child node 38. The differential customization specification can be used for customization of the feature L for context value "L3". The child node 36 has a child node 39 having an assigned context value "X2a". A differential customization specification can be assigned to the child node 39. The differential customization specification can be used for customization of the feature L for context value "X2a". The child node 36 has another child node 40 having an assigned context value "X2b". A differential customization specification can be assigned to the child node 40. The differential customization specification can be used for customization of the feature L for context value "X2b".

The rooted tree 47 has a root node 42 having an assigned context value "Global". A global customization specification "Global" is assigned to the root node 34. The global customization "Global" is used for a default customization of language settings of the computer system. The root node 42 has a child node 45 having an assigned context value "CN". A differential customization specification can be assigned to the child node 54. The differential customization specification can be used for customization of the language settings for China. The root node 42 has another child node 42 having an assigned context value "DE". A differential customization specification can be assigned to the child node 43. The differential customization specification can be used for customization of the language settings for Germany. The root node 42 has yet another child node 44 having an assigned context value "FR". A differential customization specification can be assigned to the child node 44. The differential customization specification can be used for customization of the language settings for France. The root node 42 has a child node 46 having an assigned context value "US". A differential customization specification can be assigned to the child node 46. The differential customization specification can be used for customization of the language settings for USA.

The rooted tree 50 has a root node 48 having an assigned context value "F1 off". A global customization specification "F1 off" is assigned to the root node 48. The global customization "F1 off" is used for a default customization of the computer system having feature F1 disabled. The root node 48 has a child node 49 having an assigned context value "F1 on". A differential customization specification can be assigned to the child node 49. The differential customization specification can be used for customization of the computer system in order to enable feature F1.

The rooted tree 51 has a root node 51 having an assigned context value "F2 off". A global customization specification "F2 off" is assigned to the root node 48. The global customization "F2 off" is used for a default customization of the computer system having feature F2 disabled. The root node 51 has a child node 52 having an assigned context value "F2 on". A differential customization specification can be assigned to the child node 52. The differential customization specification can be used for customization of the computer system in order to enable feature F2.

Another data structure can be assigned to a set of the customization dimensions. The set of customization dimensions can comprise any amount of the customization dimensions, i.e. from any two of the customization dimensions to all of them. The another data structure can be stored in the same data storage as the aforementioned data structures of the first rooted trees. The another data structure is another rooted tree having a root node. However in contrast to the first rooted trees, each of some child nodes of the another rooted tree can have more than one parent node. Each node of the another tree has an assigned (or is) tuple of nodes (or context values assigned to that nodes) of the first rooted trees each assigned to the respective customization dimension of the set of the customization dimensions. For each customization dimension of the set there is a node in any of the tuples, wherein said node being assigned to the each of the customization dimensions. This definition can be formulated in a more rigorous way: none of the tuples comprises two or more nodes assigned to the same customization dimension, wherein each of the tuples has a number of nodes being equal to a number of customization dimensions in the set of the customization dimensions. The another rooted tree represents different customization variants. Each customization variant is represented by the respective node in the another rooted tree. In other words the tuple of context values can be used as a coordinate of the respective customization variant in the multidimensional customization space.

The root node of the another rooted tree is assigned to (or is) a tuple of the root nodes (or context values assigned to that root nodes) of the first rooted trees each assigned to the respective customization dimension of the set. Parent-child relationships between the nodes in the another rooted tree, also called second tree, are determined by the following rule: one node is a child node of another node when the tuple represented by the one node and the tuple represented by the another node comprise (or in more rigorous form consist of) the same nodes of the first rooted trees except for one of the nodes of one of the first rooted trees comprised in the tuple represented by the one node and the parent node of the one of the nodes of the one of the rooted trees comprised in the tuple represented by the another node. In other words, a parent node and a child node linked by a parent-child relationship in the second tree differ in one element of their tuples only, wherein the differing element of the child node in the second tree is a child node in one of the first trees, the differing element of the parent node in the second tree is a parent node in the same one of the first trees and the child node in said first tree is the child node of the parent node in said first tree. As a consequence the parent node and the child node in the second tree differ in one element of their tuples only, wherein these differing elements both belong to one of the first rooted trees and have a parent-child relationship there as well. A tuple representing any child node of the another rooted tree comprises at least one child node of any first rooted trees assigned to any of the customization dimensions. The global customization specification assigned to any of the root nodes of the tuple of the root nodes is assigned to the root node of the another rooted tree. The differential customization specification assigned to any child node of any of the first rooted trees assigned to any of the customization dimensions of the set is assigned to the child node of the another tree represented by the tuple of nodes comprising only one child node being that any child node. The another data structure can comprise further differential customization specifications each being assigned to a respective child node of the another rooted tree being represented by a tuple of nodes comprising at list two child nodes. Each of the first rooted trees assigned to any of the customization dimensions of the set has a respective number of nodes of the each of the first rooted trees. A product of all of the numbers of nodes in equal to or bigger than a number of nodes in the another rooted tree.

The data storage 15 can store further data structures having data structured therein in the same way as in the another data structure. The rooted trees of the further data structures and the another data structure are second rooted trees of a set of the second rooted trees.

Figures 5, 6:
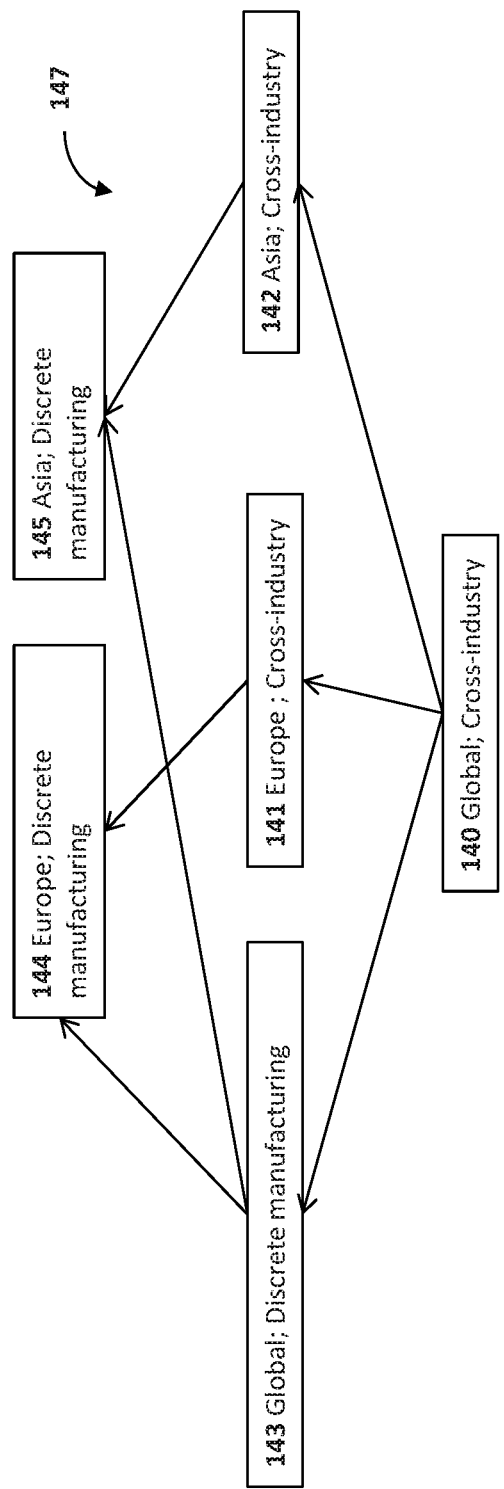
FIG. 5 is an example data structure.
FIG. 6 is an example data structure.

FIG. 5 illustrates an example of the another data structure being the second rooted tree, also called second tree. The second rooted tree represents in this example all customization variants of the computer system which can be derived using data structures depicted in FIGS. 3 and 2. The second rooted tree has a root node 140. The root node 140 is a tuple of the root nodes 125 and 130. The root node 140 has an assigned tuple of context values "Global" and "Cross-Industry". The global customization specifications "Global" and "Cross-industry" are assigned to the root node 140. The root node 140 has a child node 143. The child node is a tuple of the child node 126 and the root node 130. The child node 143 has an assigned tuple of context values "Global" and "Discrete manufacturing". The differential customization specification "Discrete manufacturing" is assigned to the child node 143. The differential customization specification "Discrete manufacturing" can be assigned to the child node 126 as well. In accordance with the aforementioned rule determining parent-child relationships between nodes in the second rooted tree the tuple of the nodes represented by the child node 143 and the tuple of the nodes represented by the root node 140 have the same node 130 and the different nodes 125 and 126, wherein the node 126 is a child node of node 125 in the first rooted tree 120.

The root node 140 has a child node 141. The child node is a tuple of the root node 125 and the child node 131. The child node 141 has an assigned tuple of context values "Europe" and "Cross-industry". The differential customization specification "Europe" is assigned to the child node 141. The differential customization specification "Europe" can be assigned to the child node 131 as well. In accordance with the aforementioned rule the tuple of the nodes represented by the child node 141 and the tuple of the nodes represented by the root node 140 have the same node 125 and the different nodes 130 and 131, wherein the node 131 is a child node of node 130 in the first rooted tree 130.

The root node 140 has a child node 142. The child node is a tuple of the root node 125 and the child node 132. The child node 142 has an assigned tuple of context values "Asia" and "Cross-industry". The differential customization specification "Asia" is assigned to the child node 142. The differential customization specification "Asia" can be assigned to the child node 132 as well. In accordance with the aforementioned rule the tuple of the nodes represented by the child node 142 and the tuple of the nodes represented by the root node 140 have the same node 125 and the different nodes 130 and 132, wherein the node 132 is a child node of node 130 in the first rooted tree 133.

A child node 144 has two parent nodes 143 and 141. The child node is a tuple of the child nodes 126 and 131. The child node 144 has an assigned tuple of context values "Europe" and "Discrete Manufacturing." A differential customization specification "Discrete manufacturing in Europe" is assigned to the child node 144. In accordance with the aforementioned rule the tuple of the nodes represented by the child node 144 and the tuple of the nodes represented by the parent node 143 have the same node 126 and the different nodes 130 and 131, wherein the node 131 is a child node of node 130 in the first rooted tree 133. Whereas the tuple of the nodes represented by the child node 144 and the tuple of the nodes represented by the parent node 141 have the same node 131 and the different nodes 125 and 126, wherein the node 126 is a child node of node 125 in the first rooted tree 120.

A child node 145 has two parent nodes 143 and 142. The child node is a tuple of the child nodes 126 and 132. The child node 145 has an assigned tuple of context values "Asia" and "Discrete Manufacturing." A differential customization specification "Discrete manufacturing in Asia" is assigned to the child node 145. In accordance with the aforementioned rule the tuple of the nodes represented by the child node 145 and the tuple of the nodes represented by the parent node 143 have the same node 126 and the different nodes 130 and 132, wherein the node 132 is a child node of node 130 in the first rooted tree 133. Whereas the tuple of the nodes represented by the child node 145 and the tuple of the nodes represented by the parent node 142 have the same node 132 and the different nodes 125 and 126, wherein the node 126 is a child node of node 125 in the first rooted tree 120.

The global customization specifications and the differential specifications of the another data structure which example is depicted in FIG. 5 can be stored in a tabular form. Each of the nodes of the second rooted tree of the another data structure (and/or each of the tuples of nodes) which has either the assigned global customization specifications or the assigned differential customization specification has an assigned row in the tabular form. The row assigned to the root node of the second rooted tree comprises all global customization specifications assigned to that root node and all context values assigned to that root node. The row assigned to any of the child nodes of the second rooted tree comprises the differential customization specification assigned to the any of the child nodes and all of the context values assigned to the any of the child nodes.

FIG. 6 illustrates an example tabular form 150 representing the another data structure having the second rooted tree depicted in FIG. 5. Each node of the second rooted tree has a respective assigned row in the tabular form 150. The root node 140 has an assigned row 151 comprising global customization specifications "Global" and "Cross-industry", a context value in the dimension "Industry" being equal to 0, and a context value in the dimension "Localization" being equal to 0. The child node 141 has an assigned row 152 comprising differential customization specification "Europe", a context value in the dimension "Industry" being equal to 0, and a context value in the dimension "Localization" being equal to 1. The child node 142 has an assigned row 153 comprising differential customization specification "Asia", a context value in the dimension "Industry" being equal to 0, and a context value in the dimension "Localization" being equal to 2. The child node 143 has an assigned row 154 comprising differential customization specification "Discrete manufacturing", a context value in the dimension "Industry" being equal to 1, and a context value in the dimension "Localization" being equal to 0. The child node 144 has an assigned row 155 comprising differential customization specification "Discrete manufacturing in Europe", a context value in the dimension "Industry" being equal to 1, and a context value in the dimension "Localization" being equal to 1. The child node 145 has an assigned row 156 comprising differential customization specification "Discrete manufacturing in Asia", a context value in the dimension "Industry" being equal to 1, and a context value in the dimension "Localization" being equal to 2.

Figure 7:
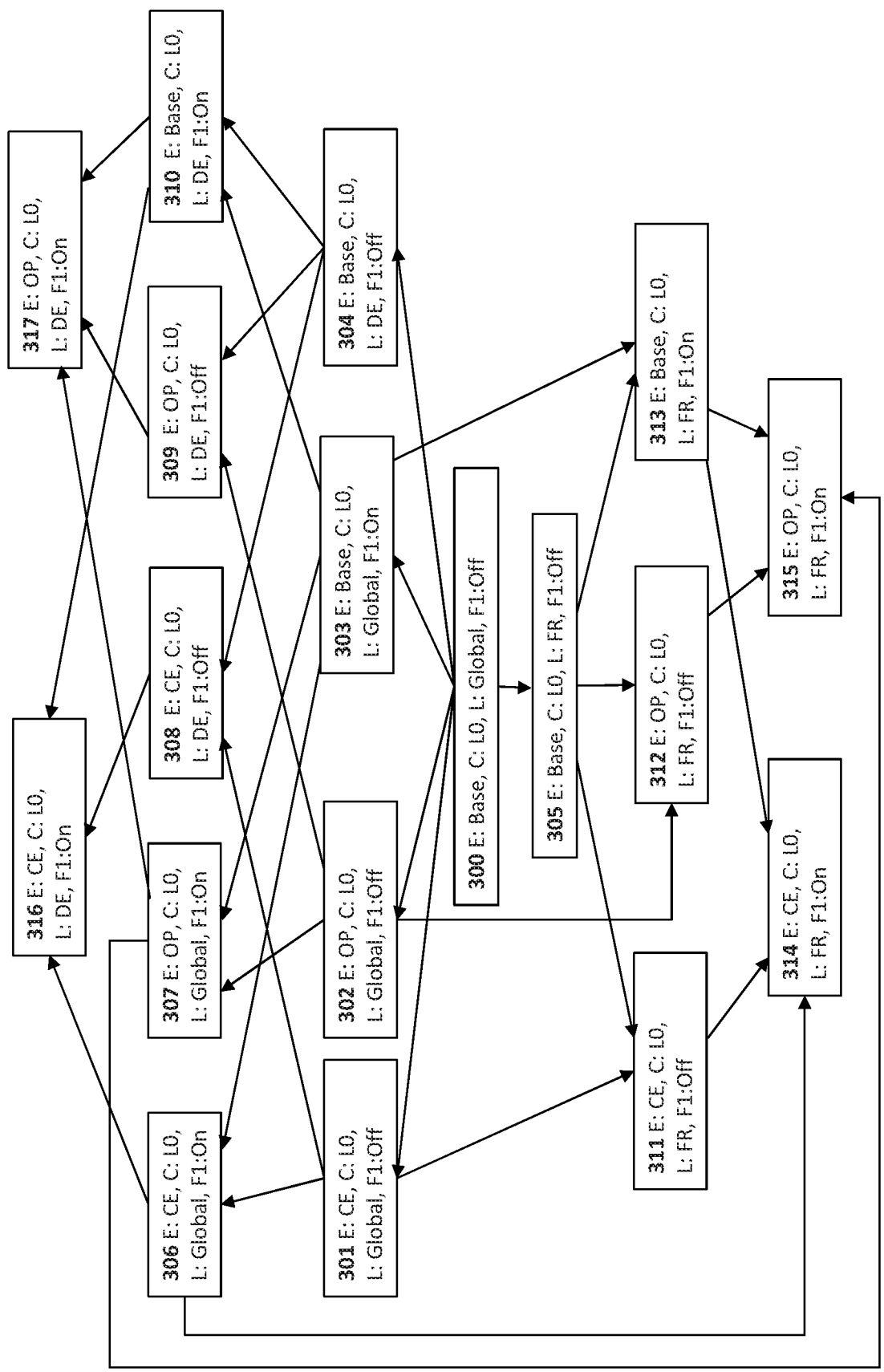
FIG. 7 is an example data structure.

FIG. 7 illustrates another example of the second rooted tree which is derived using the rooted trees 47, 41, 33, and 50 depicted in FIG. 4. Since the overall number of customization variants is 210, only a portion of them is depicted as nodes 300, 301, 302, 303, 304, 305, 306, 307, 308, 309, 310, 311, 312, 313, 314, 315, 316, 317 in FIG. 7. The second rooted tree generated in the same way as the second rooted tree depicted in FIG. 5.

Figure 8:
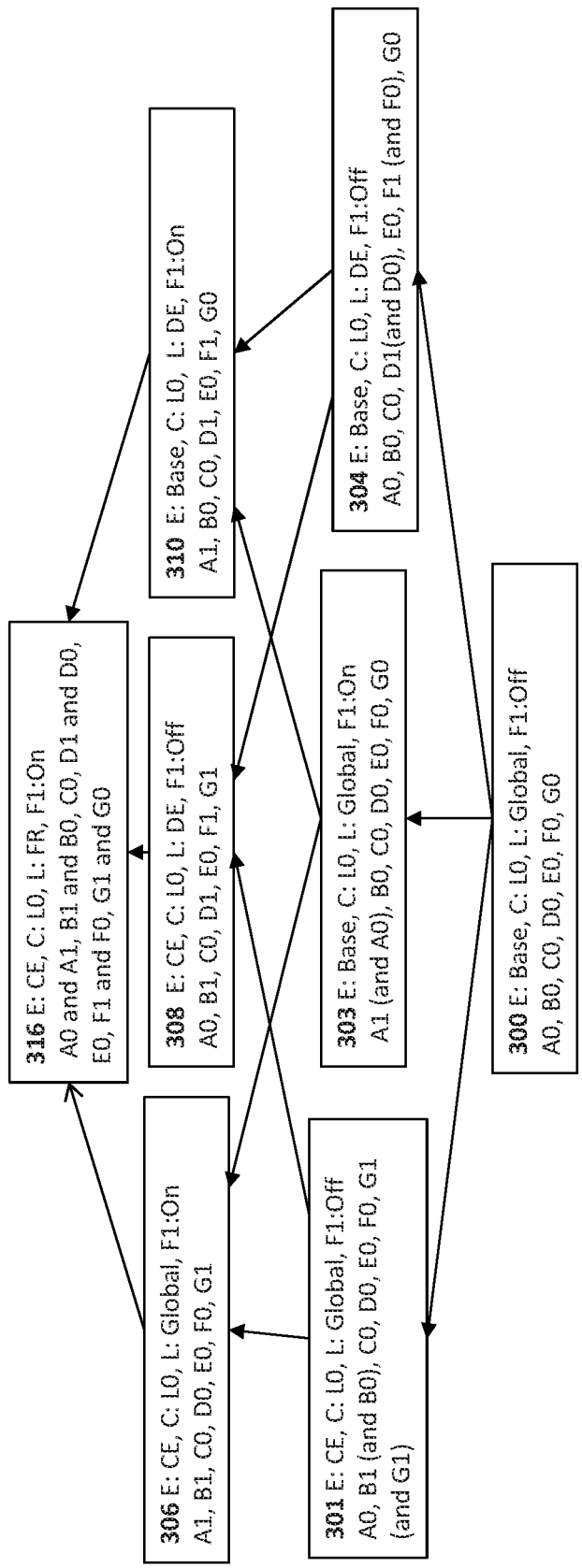
FIG. 8 is an example data structure.

FIG. 8 illustrates a fragment of the second rooted tree depicted in FIG. 7. FIG. 8 illustrates how different customization values of the global customization specification and the differential customization specifications are applied for customization of example functionalities A, B, C, D, E, F, G of the computer system. The root node 300 has the following assigned context values: "Base", "L0", "Global", and "F1: off". According to the global customization specification the following customization values are assigned to the functionalities customization value A0. Functionality B has customization value B0. Functionality B has customization value B0. Functionality C has customization value C0. Functionality D has customization value D0. Functionality E has customization value F0. Functionality F has customization value F0. Functionality G has customization value G0. The differential customization specifications used for assignment of the customization values to the functionalities of the computer system having customization variants corresponding to the child nodes depicted in FIG. 8 specify differences between customization values assigned to the functionalities of the computer system having customization variants corresponding to the nodes linked by parent-child relationships. The differences can be specified as rules determining modification of the customization values such as addition, substitution, deleting, etc.

The root node 300 has a child node 301. The child node 301 has the following assigned context values "CE", "L0", "Global", and "F1: off". According to a differential customization specification assigned to the child node 301 functionality B has customization value B1 instead of customization value B0 and functionality G has customization value G1 instead of customization value G0. As it is mentioned above the differential customization specification assigned to the child node 301 can be formulated in another way. Functionality B (G) has customization value B1 (G1) in addition to customization value B0 (G0) specified in the customization specification assigned to the root node 300. With independent of the formulation of the differential customization specification the customization values assigned to the functionalities for which no changes are formulated in the differential customization specification are the same as formulated in the global customization specification assigned to the parent node 300.

The root node 300 has another child node 303. The child node 303 has the following assigned context values "Base", "L0", "Global", and "F1: on". According to a differential customization specification assigned to the child node 303 functionality A has customization value A1 instead of (or alternatively in addition to) customization value A0 specified in the global customization valine specified in the global customization specification assigned to the root node 300.

The root node 300 has yet another child node 304. The child node 304 has the following assigned context values "Base", "DE", "Global", and "F1: off". According to a differential customization specification assigned to the child node 304 functionality D has customization value D1 instead of (or alternatively in addition to) customization value D0 specified in the global customization specification assigned to the root node 300 and functionality F has customization value F1 instead of (or alternatively in addition to) customization value F0 specified in the global customization value specified in the global customization specification assigned to the root node 300.

The second rooted tree has another child node 306 having parent nodes 301 and 303. The child node 306 has the following assigned context values "CE", "L0", "Global", and "F1: on". According to a differential customization specification assigned to the child node 306 functionalities A, B and G have only customization values added (or used instead of the customization values specified in the global customization specification assigned to the node 300) according to the differential customization specifications assigned to the parent nodes 301 and 306. Thus the functionalities A, B, and G have customization values A1, B1, and G1 respectively.

The second rooted tree has another child node 308 having parent nodes 301 and 304. The child node 306 has the following assigned context values "CE", "L0", "DE", and "F1: off". According to a differential customization specification assigned to the child node 308 functionalities B, D, F, and G have only customization values added (or used instead of the customization values specified in the global customization specification assigned to the node 300) according to the differential customization specifications assigned to the parent nodes 304 and 306. Thus the functionalities B, D, F, and G have customization values B1, D1, F1, and G1 respectively.

The second rooted tree has another child node 310 having parent nodes 303 and 304, The child node 310 has the following assigned context values "Base", "L0", "DE", and "F1: on". According to a differential customization specification assigned to the child node 310 functionalities A, D and F have only customization values added (or used instead of the customization values specified in the global customization specification assigned to the node 300) according to the differential customization specifications assigned to the parent nodes 301 and 306. Thus the functionalities A, D, and F have customization values A1, D1, and F1 respectively.

The second rooted tree has another child node 316 having parent nodes 306, 308, and 310. The child node 316 has the following assigned context values "CE", "L0", "FR", and "F1: on". According to a differential customization specification assigned to the child node 316 each of functionalities has all of the respective customization values determined for the parent nodes 306, 308, and 310. Thus functionality A has customization values A0 and A1, functionality B has customization values B0 and B1, functionality C has customization value C0, functionality D has customization values D0 and D1, functionality E has customization values E0 and E1, functionality F has customization values F0 and E1, functionality G has customization values G0 and G1.

Figure 9:
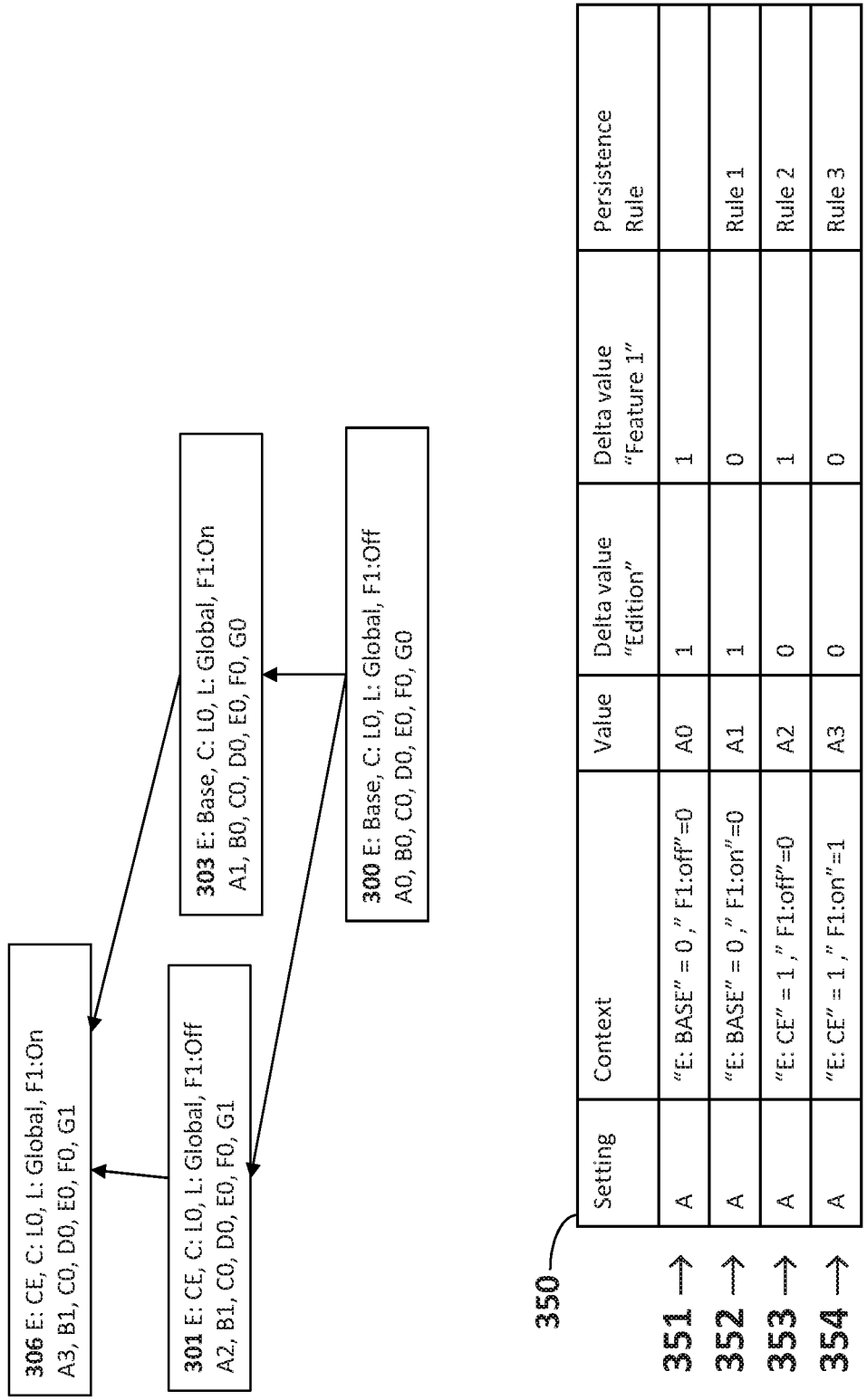
FIG. 9 is an example data structure.

In the example depicted in FIG. 8 the assignment of the customization values to the functionalities does not have any contradictions, i.e. when two different customization specifications specify of the same customization value of a particular functionality for the same node (customization variant of the computer system). However this is not always the case. FIG. 9 illustrates fragment of the second rooted tree depicted in FIG. 8. The differential customization specification assigned to the child node 306 can have no specification for the functionality A. The differential customization can specify only rule for selection of the customization value. The rule specifies ranking for each of the customization dimensions. Available customization values can be stored in a tabular form 350. In one example the tabular from can comprise only rows 351-353 used for other global and differential customization specifications. The row 351 specifies the customization value A0 for functionality A corresponding to context value "E: Base" for a customization dimension "Edition" and "F1:off" for a customization dimension "Feature 1". The row 352 specifies the customization value A1 for functionality A corresponding to context values "E: Base" for the customization dimension "Edition" and "F1:on" for the customization dimension "Feature 1". The row 353 specifies the customization value A1 for functionality A corresponding to context values "E: CE" for the customization dimension "Edition" and "F1:off" for the customization dimension "Feature 1". The context value "E: Base" is equal to 0. The context value "F1: off" is equal to 0. The context value "E: CE" is equal to 1. The context value "F1: on" is equal to 1.

The selection of the customization value can be performed using the rule as follows. First delta values are calculated for each row. The delta values are differences between the context values assigned to the node for which the customization value is to be selected and the context values comprised in the rows. The context values of the node for which the customization value is to be selected are "E: CE"=1 and "F1: on"=1. In the customization dimension "Edition" the delta value is equal to 1 for the row 351, 1 for the row 352, and 0 for the row 353. In the customization dimension "Feature 1" the delta value is equal to 1 for the row 351, 0 for the row 352, and 1 for the row 353. The selection of a row can be executed as follows. The rows having the least delta values are selected for the customization dimension having the highest ranking. When the customization dimension "Edition" has lower ranking than the customization dimension "Feature 1", then the row 352 is selected. As a result thereof the customization value comprised in the row 352 is used for the customization of the computer system corresponding to the node 306.

The rows of the tabular form (e.g. depicted in FIG. 9) can further comprise persistence rules. Alternatively, the persistence rules can be stored in another tabular form, e.g. table. The persistence rule comprised in one of the rows can specify usage of one or more other customization values comprised in one or more other rows of the tabular form in combination with the customization value comprised in the one of the rows. Alternatively or in addition the persistence rule can specify changes in a list of customization values used for customization of the computer system (or a functionality of the computer system). For instance, the rows 352-354 can comprise Rules 1-3 respectively. Rule 1 comprised in the row 352 can specify that the customization value A1 comprised in the row 252 and a customization value comprised in the row comprising context values "E: BASE" for the customization dimension "Edition" and "F1:off" for the customization dimension "Feature 1" (i.e. row 351). Rule 2 comprised in the row 353 can specify that the customization value A2 comprised in the row 353 and a customization value comprised in the row comprising context value "F1:off" for the customization dimension "Feature 1" (i.e. row 351). Rule 3 comprised in the row 354 can specify that the customization value A3 comprised in the row 354 and a customization value comprised in the row comprising context value "F1:on" for the customization dimension "Feature 1" (i.e. row 352).

In case when the tabular form comprises another row 354 specifying the customization value A3 for functionality A corresponding to context values "E: CE" for the customization dimension "Edition" and "F1:on" for the customization dimension "Feature 1", two rows 352 and 354 are selected. In order to select the correct row another iteration of selection has to be performed to select one or more rows out of previously selected rows, wherein the customization dimension used in previous iteration is excluded. In this particular example there is only one not yet used dimension "Edition". The row 354 has lower delta value in this customization dimension than the row 352. Thus the row 354 is selected. As a result thereof the customization value comprised in the row 354 is used for the customization of the computer system corresponding to the node 306.

Figure 10:
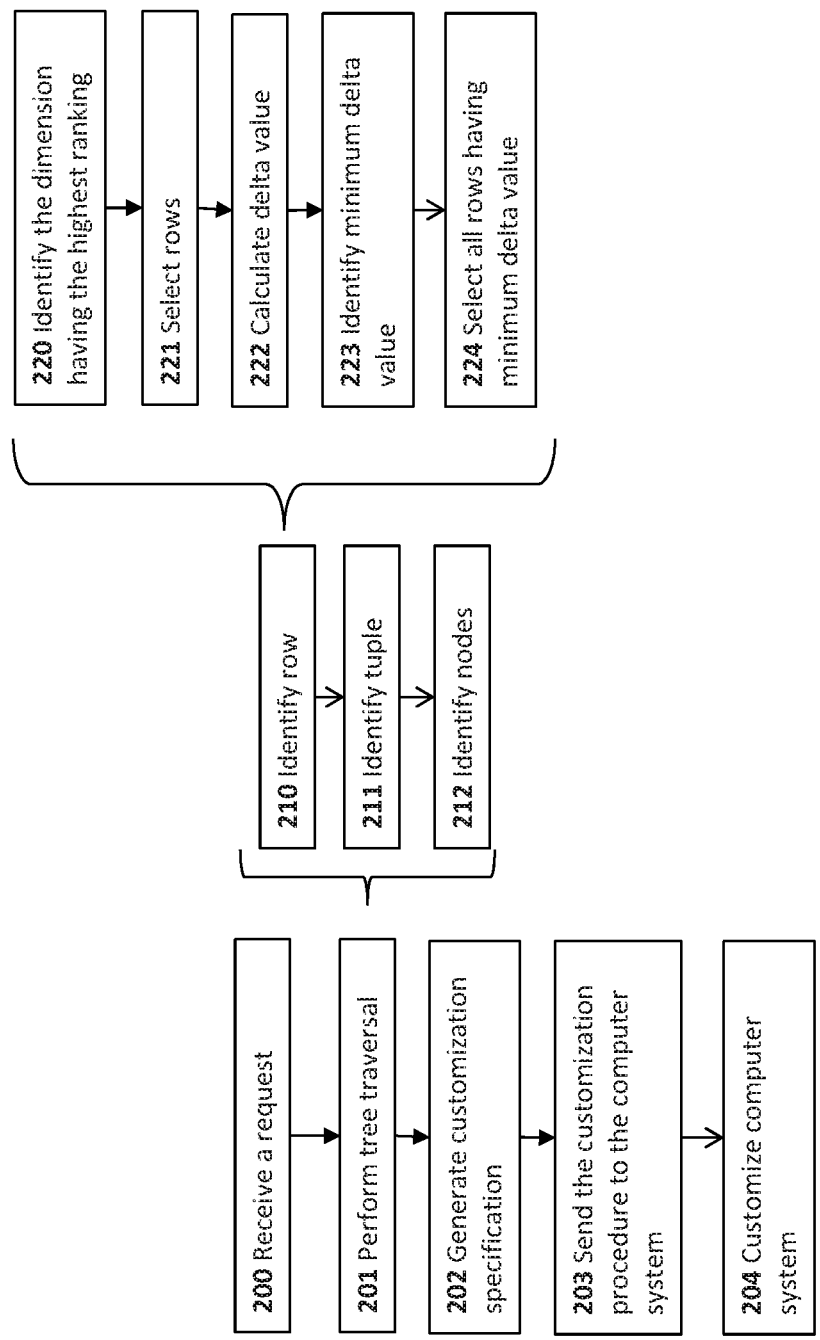
FIG. 10 is a flowchart of a computer-implemented method.

FIG. 10 illustrates a flowchart of an example method for the customization of the computer system 100. The method begins with process block 200. In process block 200, the database system 110 receives a request specifying a context value for at least some of the customization dimensions. Process block 201 is executed after process block 200. In process block 201 the database system performs a tree traversal of the second tree according to the request for those of the customization dimensions for which the context value is specified in the request. Process block 202 is executed after process block 201. In process block 202 the database system generates a customization specification for the system using the global customization specifications by modifying the global customization specification for those customization dimensions for which the tree traversal has been performed in accordance with the differential customization specifications given by the performed tree traversals. Process block 203 is executed after process block 202. Process block 204 is executed after process block 202. In process block 204 the computer system is customized according to the generated customization specification. Execution of the process block 204 can be controlled by the activation component 111, which can be comprised in the database system 110. The generated customization specification can comprise one of the global customization specifications and one of the differential customization specifications.

Process block 201 can comprise a sequence of process blocks 210-212. The sequence of process blocks begins with process block 210. In process block 210 the row in the tabular form is identified according to a rule on a basis of the context values specified in the request received in process block 200. The rule can be stored in the database system. Process block 211 is executed after process block 210. In process block 211 the tuple of nodes assigned to the identified row is identified. Process block 212 is executed after process block 211. In process block 212 the database system identifies in the second tree nodes linked by parent-child relationships starting from the root node up to and including the child node representing the identified tuple. Execution of process block 211 can be skipped, when the identified in process block 210 row is assigned to the child node used in process block 212 (i.e. the child node representing the identified node).

As it is mentioned above a child node in the second tree can have more than one parent node. With this respect execution of process block 212 can have different optional variants. In a first variant all nodes being linked by parent-child relationships starting from the root node up to and including the child node representing the identified tuple are selected in process block 212. This variant can be executed iteratively. In the first iteration all nodes being parent nodes of the identified child node representing the identified in process block 211 tuple are identified. In each next iteration, all nodes being parent nodes of all nodes identified in the previous iteration executed immediately before the each next iteration are identified. The iterations are executed until the root node of the second tree is identified.

Execution of this variant can be illustrated in using the second tree depicted in FIG. 5. The tuple represented by the child node 144 can be identified in process block 211. Afterwards the child node 144 is identified in process block 212. The nodes 141 and 143 are identified in the first iteration. The root node 140 is identified in the second iteration being the last iteration. This example is further referred in the text as the first example.

In a second variant only one chain of nodes being linked by parent-child relationships starting from the root node up to and including the child node representing the identified tuple are selected in process block 212. This variant can be executed iteratively as well. In the first iteration the node being a parent node of the identified child node representing the identified in process block 211 tuple is identified. The identified node is selected from all nodes being parent nodes of the child node representing the identified tuple. The selection of the identified node is executed using context values comprised in the rows assigned to the tuples represented by nodes being the parent nodes of the child node representing the identified in process block 211 tuple according to the rule used in process block 210 on a basis of the context values specified in the request. In other words, the selection of the identified node is executed according to the rule used in process block 210 using context values comprised in the rows assigned to the parent nodes of the child node assigned to the identified in process block 210 row. In each next iteration, the node identified in the previous iteration executed immediately before the each next iteration is used for identification of another node in the each next iteration as described above. The iterations are executed until the root node of the second tree is identified.

Execution of the second variant can be illustrated in using the second tree depicted in FIG. 5. The tuple represented by the child node 144 can be identified in process block 211. Afterwards the child node 144 is identified in process block 212. One of the nodes 141 and 143 is identified in the first iteration according to the rule. The root node 140 is identified in the second iteration being the last iteration. This example is further referred in the text as the second example.

The generating by the database system of the customization specification (process block 202) comprises generating a sequence of customization procedures using the differential customization specifications comprised in the rows assigned to the tuples represented by the identified child nodes and the global customization specifications comprised in the row assigned to the tuple of the root nodes. The customizing of the computer system according to the generated customization specification in process block 204 comprises execution of the generated sequence of customization procedures.

In the customization procedure being the first in the sequence the computer system is customized using the global customization specifications comprised in the row assigned to the tuple of the root nodes identified in process block 212. In the customization procedure executed immediately after the first customization procedure the computer system is customized using the differential customization specification comprised in the row assigned to the tuple represented by the identified child node having a parent node being the root node identified in process block 212. In each next customization procedure (if any) of the sequence the computer system is customized using the differential customization specification comprised in the row assigned to the tuple represented by the identified child node having the identified parent node representing the tuple assigned to the row comprising the differential customization specification used for customization of the computer system in the customization procedure being in the sequence immediately before the each next customization procedure. In the last customization procedure of the sequence the computer system is customized using the differential customization specification comprised in the row identified in process block 210.

In other words, in the customization procedure being the first in the sequence the computer system is customized using the global customization specifications assigned to the identified in process block 212 root node of the second rooted tree. In the customization procedure executed immediately after the first customization procedure the computer system is customized using the differential customization specification assigned to the identified in process block 212 child node having a parent node being the identified in process block 212 block root node. In each next customization procedure (if any) of the sequence the computer system is customized using the differential customization specification assigned to the identified in process block 212 child node having the identified in process block 212 parent node to which the differential customization specification used for customization of the computer system in the customization procedure being in the sequence immediately before the each next customization procedure is assigned. In the last customization procedure of the sequence the computer system is customized using the differential customization specification comprised in the row identified in process block 210. This sequence of the customization procedures can be used when the nodes are identified using the aforementioned second variant of the execution of process block 212. Generation of such sequence can be illustrated using the second example. The computer system is customized using global customization specifications "Global" and "Cross-industry" in the customization procedure being the first in the sequence. In the second customization procedure, the computer system is customized using either the differential customization specification "Discrete manufacturing" (when the node 143 is identified) or the differential customization specification "Europe" (when the node 141 is identified). In the third customization procedure, the computer system is customized using the differential specification "Discrete manufacturing in Europe".

When the first variant of execution of process block 212 is used, then in any customization procedure except for the last one in the sequence the computer system is customized using more than one differential customization specification. In particular, in the customization procedure executed immediately after the first customization procedure the computer system is customized using the differential customization specifications each assigned to the respective identified in process block 212 child node having a parent node being the identified in process block 212 block root node. In each next customization procedure (if any) of the sequence the computer system is customized using the differential customization specifications each assigned to the respective identified in process block 212 child node having the identified in process block 212 parent node to which the differential customization specification used for customization of the computer system in the customization procedure being in the sequence immediately before the each next customization procedure is assigned. The differential customizations used in each of the customization procedure except for the last and the first one, if any, are assigned to child nodes identified in the respective iteration of execution of process block 212 when it is executed according to the second variant. Generation of such sequence can be illustrated using the first example. The computer system is customized using global customization specifications "Global" and "Cross-industry" in the customization procedure being the first in the sequence. In the second customization procedure, the computer system is customized using the differential customization specifications "Discrete manufacturing" and "Europe". In the third customization procedure, the computer system is customized using the differential specification "Discrete manufacturing in Europe".

As it is mentioned before, execution of the sequence of the customization procedures can be comprised in process block 204. An optional process block 203 can be executed before process block 204 and after process block 202. In process block 203 the customization procedures can be sent from the database system to the computer system. They can be sent one by one according to the sequence of the customization procedures, wherein each next customization procedure is sent only after execution (in process block 204) of the previously sent customization procedure in.

A sequence of process blocks 220-224 can be comprised in process block 210. This sequence can be used for identifying of a row in a tabular form according to the rule on a basis of specified context values, e.g. context values specified in the request received in process block 200. In this case, the rule comprises a ranking value of each of the customization dimensions. The ranking values can be integer positive numbers. In process block 220 the customization dimension having the highest ranking value is identified. Process block 221 is executed after process block 220. In process block 221 all rows comprising the context value of the identified customization dimension are selected. Process block 222 is executed after process block 221. In process block 222 a delta value being equal to an absolute value of a difference of the context value of the identified customization dimension specified in the request and the context value of the identified customization dimension comprised in the each of the selected rows is calculated for each of the selected rows. Process block 223 is executed after process block 222 in process block 223 a minimum delta value among all of the calculated delta values is identified. Process block 224 is executed after process block 223. In process block 224 all of the rows having the minimum delta value are selected. Execution of process blocks 220-224 is repeated executed iteratively until only one row is selected in the last execution of process block 224, wherein the only one selected row is the row identified in process block 210. In the first iteration in process block 220 the highest ranking is identified among those customization dimensions for which the context value is specified, e.g. in the request received in process block 220. In any next iteration in process block 220 the customization dimension having the highest ranking is identified among those customization dimensions for which the context value is specified except for each of the customization dimensions which was identified in any of the previous iterations. In the first iteration in process block 224 all rows are selected from all rows of the tabular form. In each next iteration in process block 224 all rows are selected from the all rows selected process block 224 executed in the iteration being executed immediately before the each next iteration.

Execution of this sequence of process blocks can be illustrated on the following example using example data depicted in FIGS. 6 and 5, The specified context values can be "Industry"=1 and "Localization"=1. The ranking of the customization dimension "Industry" is equal 1 and the ranking of the customization dimension "Localization" is equal to 2. In a first iteration in process block 220 the customization dimension "Localization" is selected as having the highest ranking. In the first iteration in process block 221 all rows 151-156 are selected because they have context values in the selected customization dimension "Localization". In the first iteration in process block 222 the delta values are calculated. The delta values for the rows 151, 153, 154, and 156 are equal to 1. The delta values for the rows 152 and 155 are equal to 0. In the first iteration in process block 224 the rows 152 and 155 are selected as having the minimum delta values being equal to 0, In a second iteration in process block 220 the customization dimension "Industry" is selected as having the highest ranking among not yet selected customization dimensions. In the second iteration in process block 221 the rows 152 and 155 are selected because they have context values in the selected customization dimension "Industry" and were selected in the first iteration. In the second iteration in process block 222 the delta values are calculated. The delta value for the row 152 is equal to 1. The delta value for the row 155 is equal to 0. In the second iteration in process block 224 the row 155 is selected as having the minimum delta value being equal to 0. Thus the row 155 is the identified row.

As it is mentioned before, maintaining of all customization variants can be problematic. The row 155 and the node 144 can be missing. In this case the sequence of process blocks 220-224 is executed in the aforementioned example only once resulting in identification of the row 152.

Figure 11:
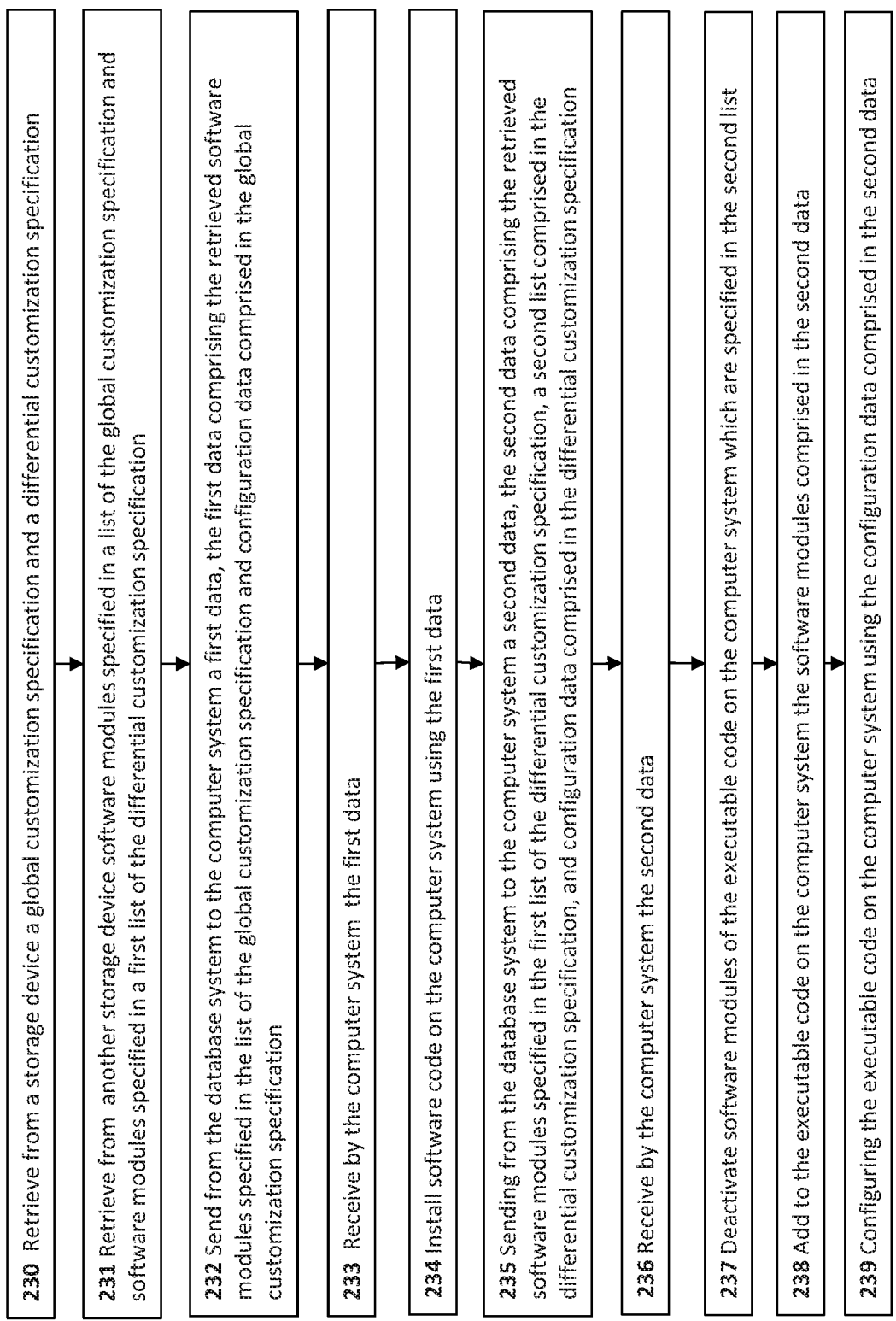
FIG. 11 is a flowchart of a computer-implemented method.

FIG. 11 illustrates another flowchart of another method which can be comprised in the method which flowchart is depicted in FIG. 10. The method begins with a process block 230 which can be comprised in process block 202. In process block 230 one of the global customization specifications and one of the differential customization specifications are retrieved from the storage device 15. The retrieval can be executed by the database system. The retrieved global customization specification and the retrieved differential customization specification are used for generation of the customization specification in process block 202. The retrieved global customization specification is the global customization specification which is to be modified according the customization specification. The retrieved differential customization specification is the differential customization specification used for the modification of the retrieved global customization specification according to the customization specification. The retrieved global customization specification comprises a list of software modules and configuration data. The retrieved global customization specification can be used for customization of the computer system in the customization procedure being the first in the aforementioned sequence of the customization procedures. The retrieved differential customization procedure can be used for customization of the computer system in the customization procedure being the second in the aforementioned sequence of the customization procedures. The retrieved differential customization specification comprises a first list of the software modules to be added to the software code, a second list of the software modules to be deactivated in the software code, and configuration data. The configuration data of the differential customization specification can comprise one or more of the aforementioned persistence rules.

Process block 231 is executed after process block 230. In process block 231 software modules specified in the list of the retrieved global customization specification and software modules specified in the first list of the retrieved differential customization specification are retrieved from the another storage device 21. The retrieval can be executed by the database system.

Process block 232 is executed after process block 231. In process block 232 first data is sent from the database system to the computer system. The first data comprises the retrieved software modules specified in the list of the retrieved global customization specification and configuration data comprised in the retrieved global customization specification. Process block 233 is executed after process block 232. In process block 233 the computer system receives the first data. Process block 234 is executed in response to execution of process block 233. In process block 234 the activation component installs the software code on the computer system code. Installation of the software code on the computer system comprises installing the software modules comprised in the first data using the configuration data comprised in the first data. The activation component causes execution of process block 235 in response to completion of the installing of the software code on the computer system in process block 234. In process block 235 second data is sent from the database system to the computer system. The second data comprises the retrieved software modules specified in the first list of the retrieved differential customization specification, the second list comprised in the retrieved differential customization specification, and configuration data comprised in the retrieved differential customization specification.

Process block 236 is executed after process block 235. In process block 236 the database system receives the second data. The activation component causes execution of process blocks 237-239 in response to execution of process block 236. In process block 237 software modules of the executable code are deactivated on the computer system. The software modules which have to be deactivated, are specified in the second list comprised in the second data. Process block 238 is executed after process block 237. In process block 238 the software modules comprised in the second data are added to the executable code on the computer system. Process block 239 is executed after process block 238. In process block 239 the executable code is configured on the computer system using the configuration data comprised in the second data. Process blocks 234 and 236-239 can be comprised in process block 204.

The computer system can have several functionalities. The aforementioned methods can be executed for each (of some) of the functionalities sequentially or in parallel. In case of the sequential execution, the sequence can be determined by a ranking of the functionalities, wherein the functionalities having higher ranking are customized before other functionalities having lower ranking.

The preceding figures and accompanying description illustrate the example processes and computer implementable techniques. But example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "computer system" or "database system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

The executable code, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of the executable code can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The invention claimed is:

1. A computer-implemented method for customization of a computer system, the customization having multiple customization dimensions, each customization dimension having assigned a data structure stored in a database, each data structure being a first tree of a set of first trees, each child node of each first tree having only one parent node, each first tree having a root node that is assigned a global customization specification corresponding to the customization dimension to which the first tree is assigned, a second tree being assigned to the multiple customization dimensions, the second tree being defined by tuples, each tuple having at least one node of any first tree of the set of first trees, each child node of each first tree and the second tree having assigned a differential customization specification, wherein each node of the set of the first trees has a context value assigned to one of the customization dimensions, the method comprising:

receiving by the database a request specifying the context values assigned to at least some of the customization dimensions;

performing by the database a tree traversal of the second tree;

generating by the database a customization specification for the computer system using the global customization specification of at least one node by modifying the global customization specification for each customization dimension to which the context values specified in the request are assigned in accordance with the differential customization specification of at least one node of the second tree of which the tree traversal is performed; and customizing the computer system according to the customization specification generated by the database.

2. The computer-implemented method of claim 1, wherein each tuple is represented by a node of the second tree that includes a parent-child relationship associating a first child node and a first parent node, the first parent node being represented by a first tuple of nodes of a first tree and the first child node being represented by a second tuple of nodes of the first tree, wherein at least one node of the first tuple of nodes has a parent-child relationship with at least one node of the second tuple of nodes.

3. The computer-implemented method of claim 2, wherein the global customization specification of at least one node of the first tree and the differential customization specification of at least one node of the first tree are assigned to one or more tuples of the tuples defining the second tree, the second tree being stored in a tabular form, wherein, for the second tree, each respective tuple except for a tuple represented by a root node of the second tree has in the tabular form an assigned row having all of the context values of the nodes of the respective tuple and the differential customization specification assigned to the respective tuple, wherein an assigned row for the tuple represented by the root node of the second tree includes all of the context values of the nodes of the tuple represented by the root node of the second tree and all of the global customization specifications of the nodes of the tuple represented by the root node, wherein the database stores a rule for selection of one of the rows on a basis of context values specified in requests, wherein the performing by the database of the tree traversal of the second tree according to the request for the customization dimensions for which the context value is specified in the request includes, identifying a row according to the rule on a basis of the context values specified in the request;

identifying the tuple to which the row is assigned; and identifying the nodes in the second tree of which the tree traversal is performed that are linked by parent-child relationships starting from the root node up to and including the child node representing the identified tuple;

wherein generating the customization specification by the database includes generating a sequence of customization procedures using the differential customization specification included in the rows assigned to each tuple represented by the nodes identified in the second tree of which the tree traversal is performed and the global customization specification of at least one node included in the row assigned to the tuple of the root nodes, wherein the customizing of the computer system according to the customization specification generated by the database includes execution of the sequence of customization procedures.

4. The computer-implemented method of claim 3, wherein a first customization procedure in the sequence is customized using the global customization specification of at least one node included in the row assigned to the tuple of the root nodes, wherein in each next customization procedure of the sequence the computer system is customized using the differential customization specification included in the row assigned to the tuple represented by the child node identified in the second tree of which the tree traversal is performed and the parent node identified in the second tree that represents the tuple assigned to the row including either the global customization specification of at least one node used for customization of the computer system in a preceding customization procedure that is in the sequence immediately before a next customization procedure or the differential customization specification used for customization of the computer system in the preceding customization procedure that is in the sequence immediately before the next customization procedure, wherein in a last customization procedure that is last in the sequence the computer system is customized using the differential customization specification included in the identified row.

5. The computer-implemented method of claim 3, wherein the rule includes a ranking value of each of the customization dimensions, wherein the identifying of the row according to the rule on the basis of the context values specified in the request includes,
   identifying the customization dimension having a highest ranking value;
   selecting all rows having the context value of the identified customization dimension;
   calculating, for each of the selected rows, a delta value being equal to an absolute value of a difference of the context value of the identified customization dimension specified in the request and the context value of the identified customization dimension included in the each of the selected rows;
   identifying a minimum delta value among selected rows; and
   selecting all of the rows having the minimum delta value, wherein in a first iteration in the step of identifying of the customization dimension the customization dimension having a highest ranking is identified among the customization dimensions for which the context value is specified in the request, wherein in any next iteration in the step of identifying of the customization dimension the customization dimension having the highest ranking is identified among the customization dimensions for which the context value is specified in the request except for each of the customization dimensions which was identified in any previous iteration, wherein the first iteration includes selecting all rows of the tabular form that have the context value of the identified customization dimension, wherein each next iteration of a set of at least one next iterations includes selecting all rows having the context value of the identified customization dimension from the all rows selected in the step of selecting of the all rows having the context value of the identified customization dimension executed in a preceding iteration that is executed immediately before each next iteration, wherein execution of iterations is continued until a last selection that includes selecting all of the rows having the minimum delta value in which only one row is selected, wherein the only one row is the row that has been identified according to the rule.

6. The computer-implemented method of claim 3, further comprising:
   sending the customization procedures from the database to the computer system individually according to the sequence, wherein each next customization procedure is sent only after execution of a previously sent customization procedure in the execution of the sequence of the customization procedures.

7. The computer-implemented method of claim 1, wherein a transport component is communicatively coupled to the computer system and the database, and the method includes,
   sending the customization specification from the database to the computer system via the transport component.

8. The computer-implemented method of claim 1, wherein an activation component is configured for controlling of execution of customizations of computer system according to the customization specification, wherein execution of the customizing of the computer system according to the customization specification generated by the database is controlled by the activation component.

9. The computer-implemented method of claim 8, wherein the activation component is included in the database.

10. The computer-implemented method of claim 1, wherein the computer system is operable for execution of an executable code, wherein the executable code includes software modules being configurable using configuration data, wherein each of the global customization specification includes a list of the software modules and configuration data, wherein the differential customization specification of each node includes a first list of the software modules to be added to the executable code, a second list of the software modules to be deactivated in the executable code, and configuration data, wherein the customization specification generated by the database includes one of the global customization specification of at least one node and the differential customization specification of at least one node, wherein the global customization specification of each node and the differential customization specification of each node are stored in a data storage of the database, wherein the software modules are stored in another data storage of the database, wherein the method includes,
   retrieving, from the data storage, the one of the global customization specification of at least one node and the differential customization specification of at least one node;
   retrieving, from the another data storage, software modules specified in a list of the one of the global customization specification of at least one node and software modules specified in a first list of the differential customization specification of at least one node;
   sending, from the database to the computer system, first data, the first data including the software modules retrieved from the another data storage and specified in the list of the one of the global customization specification of at least one node and configuration data included in the one of the global customization specification of at least one node; and
   sending, from the database to the computer system, second data, the second data including the software modules retrieved from the another data storage and specified in the first list of the differential customization specification of at least one node, the second list included in the one of the differential customization specification of at least one node, and the configuration data included in the differential customization specification of at least one node.

11. The computer-implemented method of claim 10, wherein an activation component is configured for controlling of execution of sending data from the database to the computer system and execution of customizing of computer systems according to the customization specification, and
   the computer system is customized according to the customization specification generated by the database by,
      receiving by the computer system the first data; and
      in response to the receiving by the computer system of the first data the activation component installing the executable code on the computer system, wherein the installing of the executable code on the computer system includes installing the software modules included in the first data using the configuration data included in the first data,
   wherein the activation component causes the sending from the database to the computer system of the second data in response to completion of the installing of the executable code on the computer system by the activation component;
receiving by the database the second data; and
in response to the receiving by the computer system of the second data the activation component,
deactivating software modules of the executable code on the computer system which are specified in the second list included in the second data;
adding to the executable code on the computer system the software modules included in the second data; and
after the deactivating of the software modules of the executable code on the computer system and the adding to the executable code on the computer system of the software modules included in the second data configuring the executable code on the computer system using the configuration data included in the second data.

12. A non-transitory computer readable medium having stored thereon a computer executable code for execution by a computer processor controlling a computer system, wherein execution of the computer executable code causes the computer processor to execute the computer-implemented method of claim 1.

13. A database server comprising a processor and a database for customization of a computer system, the customization having multiple customization dimensions, each dimension having an assigned data structure stored in the database, each data structure being a first tree of a set of first trees, each child node of each first tree having only one parent node, each first tree having a root node that is assigned a global customization specification corresponding to the customization dimension to which the first tree is assigned, a second tree being assigned to the multiple customization dimensions, the second tree being defined by tuples, each tuple including at least one node of any first tree of the set of first trees, each child node of each first tree and the second tree having assigned a differential customization specification, wherein each node of the set of the first trees has a context value assigned to one of the customization dimensions, the database being configured to,
receive a request specifying the context values assigned to at least some of the customization dimensions;
perform a tree traversal of the second tree;
generate a customization specification for the computer system using the global customization specification of at least one node by modifying the global customization specification for each customization dimension to which the context values specified in the request are assigned in accordance with the differential customization specification of at least one node of the second tree of which the tree traversal is performed; and
customize the computer system according to the customization specification generated by the database.

14. The database server of claim 13, wherein each tuple is represented by a node of the second tree that includes a parent-child relationship associating a first child node of the second tree and a first parent node of the second tree, the first parent node being represented by a first tuple of nodes of a first tree and the first child node being represented by a second tuple of nodes of the first tree, wherein at least one node of the first tuple of nodes has a parent-child relationship with at least one node of the second tuple of nodes.

15. The database server of claim 14, wherein the global customization specification of at least one node of the first tree and the differential customization specification of at least one node of the first tree are assigned to one or more tuples of the tuples defining the second tree, the second tree being stored in a tabular form, wherein, for the second tree, each respective tuple except for a tuple represented by a root node of the second tree has in the tabular form an assigned row including all of the context values of the nodes of the respective tuple and the differential customization specification of at least one node of the respective tuple, wherein an assigned row for the tuple represented by the root node of the second tree includes all of the context values of the nodes of the tuple represented by the root node of the second tree and all of the global customization specifications of the nodes of the tuple represented by the root node, wherein the database stores a rule for selection of one of the rows on a basis of context values specified in requests, wherein the performing by the database of the tree traversal of the second tree according to the request for the customization dimensions for which the context value is specified in the request includes,
identifying a row according to the rule on a basis of the context values specified in the request;
identifying the tuple to which the row is assigned; and
identifying the nodes in the second tree of which the tree traversal is performed that are linked by parent-child relationships starting from the root node up to and including the child node representing the identified tuple;
wherein generating the customization specification by the database includes generating a sequence of customization procedures using the differential customization specification included in the rows assigned to each tuple represented by the nodes identified in the second tree of which the tree traversal is performed and the global customization specification of at least one node included in the row assigned to the tuple of the root nodes,
wherein the customizing of the computer system according to the customization specification generated by the database includes executing the sequence of customization procedures.

16. The database server of claim 15, wherein in a first customization procedure in the sequence the computer system is customized using the global customization specification of at least one node included in the row assigned to the tuple of the root nodes, wherein in each next customization procedure of the sequence the computer system is customized using the differential customization specification included in the row assigned to the tuple represented by the child node identified in the second tree of which the tree traversal is performed and the parent node identified in the second tree that represents the tuple assigned to the row including either the global customization specification of at least one node used for customization of the computer system in a preceding customization procedure that is in the sequence immediately before a next customization procedure or the differential customization specification used for customization of the computer system in the preceding customization procedure that is in the sequence immediately before the next customization procedure, wherein in a last customization procedure that is last in the sequence the computer system is customized using the differential customization specification included in the identified row that has been identified according to the rule.

17. The database server of claim 15, wherein the rule includes a ranking value of each of the customization dimensions, wherein the identifying of the row according to the rule on the basis of the context values specified in the request iteratively includes, identifying the customization dimension having a highest ranking value;

selecting all rows including the context value of the identified customization dimension;

calculating, for each of the selected rows, a delta value being equal to an absolute value of a difference of the context value of the identified customization dimension specified in the request and the context value of the identified customization dimension included in the each of the selected rows;

identifying a minimum delta value among the selected rows; and selecting all of the rows having the minimum delta value, wherein in a first iteration in the step of identifying of the customization dimension the customization dimension having a highest ranking is identified among the customization dimensions for which the context value is specified in the request, wherein in any next iteration in the step of identifying of the customization dimension the customization dimension having the highest ranking is identified among the customization dimensions for which the context value is specified in the request except for each of the customization dimensions which was identified in any previous iteration, wherein the first iteration includes selecting all rows of the tabular form that have the context value of the identified customization dimension, wherein each next iteration in a set of at least one next iterations includes selecting all rows including the context value of the identified customization dimension from the all rows selected in the step of selecting of the all rows including the context value of the identified customization dimension executed a preceding the iteration that is executed immediately before the next iteration, wherein execution of iterations is continued until a last iteration that includes selecting all of the rows having the minimum delta value in which only one row is selected, wherein the only one row is the row that has been identified according to the rule.

18. The database server of claim 15, the database being configured to, send the customization procedures from the database to the computer system individually according to the sequence, wherein each next customization procedure is sent only after execution of a previously sent customization procedure in the execution of the sequence of the customization procedures.

19. The database server of claim 13, wherein the computer system is operable for execution of an executable code, wherein the executable code includes software modules being configurable using configuration data, wherein each of the global customization specification includes a list of the software modules and configuration data, wherein each of differential customization specification of the nodes and including a first list of the software modules to be added to the executable code, a second list of the software modules to be deactivated in the executable code, and configuration data, wherein the customization specification generated by the database includes one of the global customization specification of at least one node and the differential customization specification of at least one node, wherein the global customization specification of at least one node and the differential customization specification of at least one node are stored in a data storage of the database, wherein the software modules are stored in another data storage of the database, the database being configured to, retrieve, from the data storage, the one of the global customization specification of at least one node and the differential customization specification of at least one node;

retrieve, from the another data storage, software modules specified in a list of the one of the global customization specification of at least one node and software modules specified in a first list of the differential customization specification of at least one node;

send, from the database to the computer system, first data, the first data including the software modules retrieved from the another data storage and specified in the list of the one of the global customization specification of at least one node and configuration data included in the one of the global customization specification of at least one node; and send, from the database to the computer system, second data, the second data including the software modules retrieved from the another data storage and specified in the first list of the differential customization specification of at least one node, the second list included in the differential customization specification of at least one node, and configuration data included in the one of the differential customization specification of at least one node.

20. The database server of claim 19, wherein an activation component is configured for controlling of execution of sending data from the database to the computer system and execution of customizing of computer systems according to the customization specification, wherein the customizing of the computer system according to the customization specification generated by the database includes, receiving by the computer system the first data;

in response to the receiving by the computer system of the first data the activation component installing the executable code on the computer system, wherein the installing of the executable code on the computer system includes installing the software modules included in the first data using the configuration data included in the first data, wherein the activation component causes the sending from the database to the computer system of the second data in response to completion of the installing of the executable code on the computer system by the activation component;

receiving by the database the second data; and in response to the receiving by the computer system of the second data the activation component, deactivating software modules of the executable code on the computer system which are specified in the second list included in the second data;

adding to the executable code on the computer system the software modules included in the second data; and after the deactivating of the software modules of the executable code on the computer system and the adding to the executable code on the computer system of the software modules included in the second data configuring the executable code on the computer system using the configuration data included in the second data.

* * * * *